United States Patent

[11] 3,621,093

| [72] | Inventors | Glenn R. Svoboda<br>Grafton, Wis.;<br>Fred G. Singleton, Pittsburgh, Pa.; Lindley<br>H. Eshleman, Port Washington, Wis. |
|---|---|---|
| [21] | Appl. No. | 838,339 |
| [22] | Filed | July 1, 1969 |
| [45] | Patented | Nov. 16, 1971 |
| [73] | Assignee | Freeman Chemical Corporation<br>Port Washington, Wis.<br>Continuation-in-part of application Ser. No.<br>516,739, Dec. 27, 1965, now abandoned. |

[54] PROCESS FOR MAKING REINFORCED THERMOSET ARTICLES
6 Claims, No Drawings

[52] U.S. Cl. .................................................. 264/331,
260/23.5, 260/836
[51] Int. Cl. .................................................. B29g 1/00

[50] Field of Search .......................................... 264/331;
260/836

[56] References Cited
UNITED STATES PATENTS

| 3,256,226 | 6/1966 | Fekete et al. ................ | 260/23.5 |
| 3,301,743 | 1/1967 | Fekete et al. ................ | 260/836 |

Primary Examiner—Robert F. White
Assistant Examiner—G. Auville
Attorneys—Harry B. Keck and George E. Manias ABSTRACT: An improved process for rapidly making reinforced thermoset articles from molding compositions which include unsaturated polyester resins and fillers utilizing molding apparatus having heated mold surfaces. The molding composition includes 0.1 to 0.20 parts by weight of polyacrylates of polyepoxides. The cure time for the resulting article is less than one-half that required for molding compositions containing the identical unsaturated polyester resins without the polyacrylates of polyepoxides.

PROCESS FOR MAKING REINFORCED THERMOSET ARTICLES

CROSS-REFERENCES TO RELATED APPLICATIONS (IF ANY)

This application is a continuation-in-part of copending application Ser. No. 516,739 filed Dec. 27, 1965, which became abandoned following the filing of this application.

BACKGROUND OF THE INVENTION

1. Field of the Invention

The process of making reinforced plastic articles in molding apparatus having heated surfaces utilizing molding compositions including unsaturated polyester resins.

2. Description of the Prior Art

Unsaturated polyester resin compositions are widely used in modern industry. These materials include an ethylenically unsaturated polyester resin which is in itself the polyesterification reaction product of polyhydric alcohols and polycarboxylic compounds such as polycarboxylic acids or polycarboxylic acid anhydrides wherein at least a portion of the polycarboxylic compounds contain ethylenic unsaturation. The unsaturated polyester resin is combined with suitable cross-linking compounds having a terminal

radical. In order to take advantage of high-speed manufacturing techniques, it is desirable that such compositions be rapidly cured in certain circumstances. Rapid curing compositions are particularly desirable where the unsaturated polyester resin is combined with essentially inert fillers which may include fibrous reinforcement to form molding compounds. Such molding compounds are commercially used in matched metal dies which are operated at elevated temperatures. Rapid curing compositions are also desirable in the pultrusion process (Modern Plastics Encyclopedia, 1966 Edition, McGraw-Hill, published Sept. 1965, page 632), wherein continuous reinforcing fibers are impregnated with unsaturated polyester resin and pulled through a heated steel die. The speed of resin cure determines the speed of the pultrusion production.

Polymerizable polyacrylates of polyepoxides are known in the art as being capable of homopolymerization and of copolymerization with unsaturated polyesters. See U.S. Pat. Nos. 3,256,226; 3,301,743; 3,317,465.

Polyester Resins

Unsaturated polyester resin compositions are prepared by reacting polyhydric compounds with polycarboxylic compounds under esterification conditions. The polycarboxylic compounds may be polycarboxylic acid anhydrides so long as substantial portion of the polycarboxylic compound contains ethylenic unsaturation.

Typical polyhydric compounds include ethylene glycol, polyethylene glycol, propylene glycol, polypropylene glycol, butylene glycol, polybutylene glycol and the like. Typical carboxylic compounds include phthalic acid, phthalic anhydride, isophthalic acid, terephthalic acid, adipic acid, oxalic acid, endomethylene tetrahydrophthalic anhydride, endomethylene tetrahydrophthalic acid, hexachloroendomethylene tetrahydrophthalic acid, hexachloroendomethylene tetrahydrophthalic anhydride, maleic acid, maleic anhydride, fumaric acid, itaconic acid, citraconic acid, and the like.

The resulting polyester is dissolved in a suitable unsaturated cross-linking monomer containing terminal $C=CH_2$, such as styrene, vinyl toluene, divinyl benzene, methylmethacrylate, ethylmethacrylate, methylacrylate, ethylacrylate, acrylic acid, methacrylic acid, diallyl phthalate, triallyl cyanurate, orthochloro-styrene, and the like.

Customarily the unsaturated polyester resin composition contains a suitable polymerization inhibitor such as hydroquinone, quinone, alkyl phenols, and the like to prevent premature gelatin. The materials are cured to hardened thermoset condition by the addition of suitable polymerization initiators such as organic peroxy compounds, for example, benzoyl peroxide, dicumyl peroxide, and the like. The catalyzed resin compositions are usually heated to achieve prompt curing.

Molding compositions are formulated from 40 to 95 parts by weight of the unsaturated polyester resin composition and from 60 to 5 parts by weight of essentially inert fillers such as carbonates, silicates, clays, glass fibers, mineral fibers, pigments, and the like. The molding compositions usually contain a small quantity of a mold release agent.

SUMMARY OF THE INVENTION

According to the present invention, the cure time required for making molded articles from unsaturated polyester resin molding compositions can be lowered to commercially desired values without adversely affecting the quality of the cured resinous products. This improvement is achieved in molding apparatus having heated molding surfaces by incorporating into the otherwise conventional molding composition from 0.01 to 0.20 parts by weight preferably 0.05 to 0.15 parts by weight) of a polyacrylate based on the weight of the unsaturated polyesters in the composition. The polyacrylate is one which is the reaction product of a polyepoxide and an ethylenically unsaturated carboxylic acid which may be methacrylic acid or acrylic acid. The polyepoxide and carboxylic acid are combined in stoichiometric proportions to provide approximately 1 mol of the acid for each epoxide group. A slight excess of the acid is tolerable. The resulting copolymerizable polyacrylate is essentially free of unreacted epoxy groups.

A preferred copolymerizable polyacrylate is the reaction product of 1 mol of the diglycidyl ether of bisphenol-A and 2 mols of methacrylic acid. Other suitable polyepoxides include similar epoxy resins having higher epoxide numbers such as:

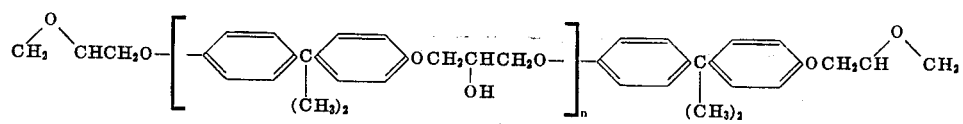

wherein $n$ has a value from zero to about 10.

The present copolymerizable polyacrylates can be prepared by the reaction of 2 mols of an ethylenically unsaturated glycidyl ester such as glycidyl methacrylate or glycidyl acrylate, with 1 mol of a Bisphenol or a Bisphenol ether having the formula:

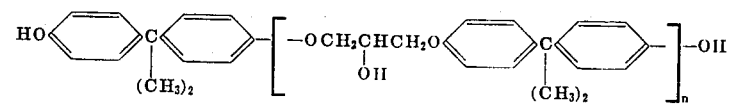

wherein $n$ has a value from zero to about 10.

Other suitable epoxides include the polyepoxides of phenol-formaldehyde novalac resin:

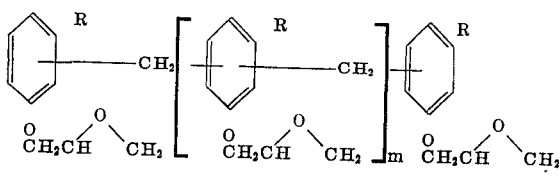

wherein $m$ is an integer from zero to five and R is hydrogen or an alkyl substituent having one to four carbon atoms.

DESCRIPTION OF THE PREFERRED EMBODIMENT(S)

The production of reinforced molded articles from molding apparatus having heated molding surfaces can be speeded by the practice of the present process. In such processes, as presently practiced, a suitable molding composition, sometimes called the premix composition, is introduced into a molding apparatus having heated molding surfaces, e.g., a matched metal die molding apparatus or a pultrusion apparatus. The molding composition of fillers and resin is retained within the molding apparatus at a temperature of 150° to 500° F. for a molding period which is established by the mold operator through experience, taking into consideration the precise properties of the molding composition, the size and complexity of the ultimately molded product, the cycling characteristics of the molding apparatus, mold heating capacity, et cetera. Following the molding period, the molding composition is separated from the heated molding surfaces and is recovered as a cured thermoset reinforced plastic article.

By practicing the present invention, the molding period can be shortened to less than one-half of that which is required for the operation with the otherwise identical unsaturated polyester resin composition for the same part at the same molding temperature.

The benefits and unexpected properties of the present process improvement will be described through the following examples.

EXAMPLE I

A conventional polyester resin was prepared from the following ingredients:
30.93 pounds propylene glycol
32.86 pounds maleic anhydride
14.52 pounds isophthalic acid
1.0 grams hydroquinone The described ingredients were esterified at about 400° F. for several hours to produce an unsaturated polyester resin having an acid value of 19 to 25. The quantity of unsaturated polyester resulting after elimination of the water of esterification was 71.0 pounds. The unsaturated polyester was combined with 29 pounds styrene to form 100 pounds of a standard polyester resin syrup, identified as resinous composition I, which is commercially useful in molding powders.

EXAMPLE II

A typical molding composition is commercially prepared from 60 pounds of the resinous composition I, 40 pounds McNamee clay, 0.6 pounds added styrene, 0.6 pounds benzoyl peroxide and 0.12 pounds Zelac U.N. (a commercially available mold release agent). The molding composition, identified as molding composition II, was introduced into a commercial automobile hood mold and a commercial automobile fender mold which operate at about 275° F. Both molds are of the matched metal die variety (Modern Plastics, op. cit. page 631) having heated mold surfaces. The required molding time is about 2 minutes. Some crazing tendencies are observed in resin-rich bosses of the molded part where the thickness is approximately 0.375 inch. The term "molding time" refers to the elapsed time between placing the composition in the matched metal die and removing the parts from the mold.

EXAMPLE III

The rapid curing resinous composition of this invention was prepared as follows and identified as resinous composition III:
90.00 parts by weight of the resinous composition I;
8.00 parts by weight of the reaction product of 15.2 parts by weight of methacrylic acid and 30.6 parts by weight of diglycidyl ether of bisphenol-A, essentially free of unreacted epoxy groups
2.00 parts by weight added styrene.

EXAMPLE IV 60 pounds of resinous composition III was combined with 40 pounds McNamee clay, 0.6 pounds added styrene, 0.6 pounds benzoyl peroxide and 0.12 pounds Zelac U.N. (a commercially available mold release agent). The mixture is identified as molding composition IV.

An automobile hood and an automobile fender were fabricated in the identical described mold at 275° F. with molding composition IV. A molding time of approximately 20 seconds was achieved. The mold was actually closed for 10 to 13 seconds. The molded parts were uniform in composition. The resin-rich bosses did not exhibit any crazing. The Barcol hardness development of the parts, measured 3 minutes after removal from the mold, was the same as that of the commercial molding composition II previously described. After 1 hour, the Barcol hardness was 60–65.

The molded parts included two plies of 1.75-ounce glass fiber mats and two plies of 10 millimeter glass fiber veils. The physical properties of the molded parts include:

Tensile Strength    18,500 p.s.i.
Tensile Strength    $0.875 \times 10^6$ p.s.i.
Tensile Elongation    3.4 percent
Flexural Strength    34,350 p.s.i.
Impact, Izod, notched    20.0 ft.-lbs.

EXAMPLE V

Motor covers with glass fiber reinforcement were prepared in commercial matched metal dies having heated surfaces with the resin composition I. A molding time of 1 minute, 50 seconds is required.

EXAMPLE VI

Motor covers with glass fiber reinforcement were prepared in the commercial molds of example V at 260°–265° F. with a molding time of 45 seconds. The cavity temperature was 285° F. Three different resinous compositions were utilized as follows:

A. Resinous composition I
B. Resinous composition III
C. A mixture of three parts of resinous composition III and one part of resinous composition I. The motor cover from composition (A) was obviously undercured. Following molding, the two motor covers from resins (B) and (C) were baked at 325° F. for 30 minutes. Both of the motor covers were uncracked and uncrazed. There was no evidence of undercure. All of the three motor covers were fabricated without glass fiber surface veils, which are normally applied in such motor covers. The absence of the surface veil renders the tests (A), (B), (C) more severe than the usual commercial operation insofar as the surface appearance of the products is concerned.

EXAMPLE VII

Resinous composition IV was used in the commercial automobile hood and fender molds described in example II. With the mold at 275° F., satisfactory hoods and fenders were obtained at 20 seconds molding time. At temperatures of 300° F., molding times of 10 to 14 seconds yield satisfactory products.

Resinous composition III contains 0.71×90.0=63.9 parts by weight of unsaturated polyester. Resinous compositions III contains 8.0 parts by weight of the copolymerizable polyacrylate of methacrylic acid and the diglycidyl ether of bisphenol-A. Thus the resinous composition III contains about 0.125 parts by weight of the polyacrylate for each part by weight of the unsaturated polyester.

The molding composition (C) of example VI contains about 0.0913 parts by weight of the polyacrylate for each part by weight of unsaturated polyester.

It should be observed in the foregoing examples that the polymerizable resinous compositions which contain the copolymerizable acrylate achieve a more rapid curing cycle. Contrast example VII with example II wherein the required molding time can be changed from 2 minutes, as presently practiced, to 20 seconds with the present invention.

Typical polyester resin compositions include from 50 to 80 parts by weight of the alpha, beta-ethylenically unsaturated polyester and from 50 to 20 parts by weight of the unsaturated cross-linking monomer, such as styrene. Such compositions are identified in the resin industry as syrups. The present polymerizable compositions can be obtained by combining such syrups with the present acrylate or methacrylate materials. The present acrylate or methacrylate materials may themselves be available in a liquid composition including unsaturated cross-linking polymers, unsaturated cross-linking monomers containing terminal

such as styrene, ethylene glycol dimethacrylate, and the other materials already mentioned herein. From about 1 to 20 parts by weight of the acrylate or methacrylate are provided for each part by weight of the alpha, beta-ethylenically unsaturated polyester itself.

Accordingly the active ingredients in the present thermosetting resinous compositions include from about 50 to 80 parts by weight of the unsaturated polyester resins; from 10 to 50 parts by weight of the cross-linking material having a terminal

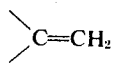

radical; and from 1 to 20 parts by weight of the present copolymerizable polyacrylate.

The polymerizable resinous composition of example III contained 63.9 parts by weight unsaturated polyester resin; 28.1 parts by weight of cross-linking material (styrene); and 8.0 parts by weight of the present copolymer.

The unexpected character of the present improvement becomes evident from the following comparison of matched metal die molding with premix molding compositions made from:

Resin 1—Conventional unsaturated polyester resin of the type described in example I;

Resin 2—A styrene solution containing 20 parts by weight styrene and 80 parts by weight of the reaction product of 2 mols methacrylic acid and 1 mol of diglycidyl ether of bisphenol-A;

Resin 3—A mixture of one part by weight of Resin 2 and 9 parts by weight of Resin 1.

All three premix resin compositions were employed in a conventional commercial matched metal die molds. The results are tabulated:

| Premix Resins | Type | Mold Surface Temperature Degrees F. | Required Molding Time Minutes |
|---|---|---|---|
| 1 | Polyester | 260–280 | 2–2.5 |
| 2 | Polyacrylate | 290 | 5 |
| 3 | Both | 260–280 | th less than 1 |

Thus the additive material, by itself (the polyacrylate in styrene), does not achieve shorter molding times than the polyester by itself—but instead requires significantly longer molding times; compare the results of resin 1 and resin 2. Hence it is indeed unexpected that the mixture of resins 1 and 2 would achieve a lowered cure time than either resin 1 or 2 alone. It should be noted that the results reported in this paragraph were obtained from an existing commercial molding installation.

The unexpected character of the present invention can be further emphasized by establishing its uniqueness to molding installations having heated molding surfaces. The present molding compositions, for example, for not manifest the increased cure time when they are employed in hand layup curing of unsaturated polyester resins. In order to establish this difference, the three resins just described were mixed with benzoyl peroxide, a conventional hand layup resin initiator, and the SPI Gel Time (180° F.) for each resin was measured. The results of this evaluation follow:

| Resin | SPI Gel Time, Minutes |
|---|---|
| 1 | 4.5 |
| 2 | 8 |
| 3 | 11 |

Thus, while the conventional unsaturated polyester resin achieved a gel in 4.5 minutes and the polyacrylate resin achieves a gel in 8 minutes, the mixture of the two requires 11 minutes for gelatin. This results when the mixture of the polyacrylate and the unsaturated polyester rein is allowed to cure underhand layup conditions, i.e., not in engagement with a heated molding surface. Hence the improved curing time which is the subject of the present invention, is unique to the heated mold surface processes, and is not achieved with other reinforced plastics fabricated processes.

We claim:

1. In the method for producing a molded reinforced plastic article from fillers and unsaturated polyester resin composition which comprises:
   a. introducing molding composition comprising a polymerizable unsaturated polyester resin composition and inert fillers into a molding zone having heated molding surfaces;
   b. retaining said molding composition within said molding zone at a molding temperature of 150 to 500 for a molding period;
   c. separating said molding composition from said molding surfaces after said molding period and recovering a cured, reinforced plastic article; the improvement comprising:
   d. prior to step (a), adding to each part by weight of the said unsaturated polyester resin composition by weight from 0.01 to 0.20 parts by weight of a polyacrylate which is essentially free of unreacted epoxy groups and is selected from a class consisting of:

I. a reaction product of polyepoxide and ethylenically unsaturated carboxylic acid selected from the class consisting of acrylic and methacrylic acid; and II. a reaction product of a Bisphenol having the formula

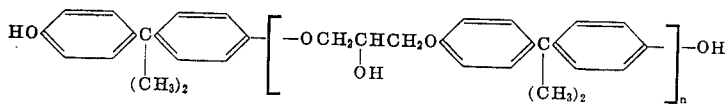

wherein *n* has a value from zero to about 10, and a glycidyl ester selected from the class consisting of glycidyl acrylate and glycidyl methacrylate; and e. carrying out the step (b) for a molding period which is

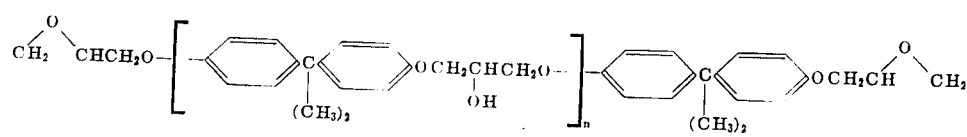

less than half of the said molding period required at the said molding temperature for the identical unsaturated polyester resin composition which does not contain the said polyacrylate.

2. The improvement of claim 1 wherein the said polyepoxide is diglycidyl ether of bisphenol-A.

3. The improvement of claim 1 wherein the said polyepoxide has the formula:

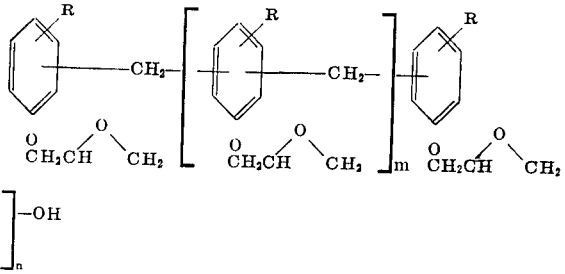

wherein *m* is an integer from zero to five and R is hydrogen or an alkyl substituent having one to four carbon atoms.

4. The improvement of claim 1 wherein the said polyepoxide has the formula:

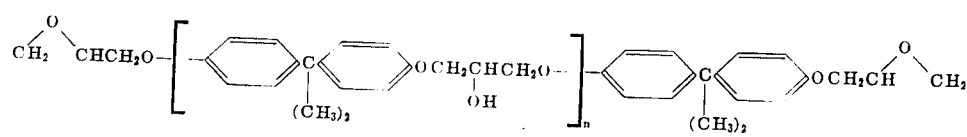

wherein *n* has a value from zero to about 10.

5. The improvement of claim 1 where the said molding zone is a matched metal die mold.

6. The improvement of claim 1 where the said molding zone is a pultrusion die.

* * * * *